United States Patent
Hashimura (10) Patent No.: US 7,063,355 B2
(45) Date of Patent: Jun. 20, 2006

(54) MOUNT STRUCTURE FOR FUEL TANK (75) Inventor: Tadayoshi Hashimura, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/772,250

(22) Filed: Feb. 6, 2004

(65) Prior Publication Data
US 2004/0155449 A1 Aug. 12, 2004

(30) Foreign Application Priority Data
Feb. 12, 2003 (JP) ............... 2003-033943
Sep. 1, 2003 (JP) ............... 2003-309146

(51) Int. Cl.
B60K 15/07 (2006.01)
(52) U.S. Cl. ...................... 280/830; 280/834
(58) Field of Classification Search ................ 280/830, 280/834, 124, 109, 781, 784, 785
See application file for complete search history.

(56) References Cited

U.S. PATENT DOCUMENTS

| 1,611,906 | A |   | 12/1926 | Gurney |           |
|-----------|---|---|---------|--------|-----------|
| 4,717,171 | A | * | 1/1988  | Kami et al. | 280/834 |
| 5,518,272 | A | * | 5/1996  | Fukagawa et al. | 280/834 |
| 5,542,707 | A | * | 8/1996  | Kamei et al. | 280/834 |
| 5,556,133 | A | * | 9/1996  | Oku et al. | 280/834 |
| 5,560,651 | A | * | 10/1996 | Kami et al. | 280/788 |
| 5,702,125 | A | * | 12/1997 | Nakajima et al. | 280/834 |
| 5,924,734 | A | * | 7/1999  | Fukagawa et al. | 280/830 |
| 6,086,103 | A |   | 7/2000  | Fukagawa et al. | |
| 6,672,260 | B1 | * | 1/2004 | Sun | 122/510 |
| 6,824,168 | B1 | * | 11/2004 | Kawazu et al. | 280/834 |
| 2002/0121772 | A1 |   | 9/2002 | Koster | |
| 2003/0189334 | A1 | * | 10/2003 | Kawasaki et al. | 280/834 |
| 2004/0239095 | A1 | * | 12/2004 | Wozniak et al. | 280/834 |

FOREIGN PATENT DOCUMENTS

JP 2001-146115 A 5/2001
JP 2002-046484 A 2/2002

* cited by examiner

Primary Examiner—Lesley D. Morris
Assistant Examiner—Matthew Luby
(74) Attorney, Agent, or Firm—Foley & Lardner LLP (57) ABSTRACT A fuel tank mount structure (24), to be placed in a lower area of a floor formed in a vehicle body, is provided including a rear suspension member (13) disposed rearward of the fuel tank and having a front edge portion formed with a front suspension cross member (27) formed in a configuration contoured along a rear profile of the fuel tank (24).

10 Claims, 6 Drawing Sheets

MOUNT STRUCTURE FOR FUEL TANK

CROSS REFERENCE TO RELATED APPLICATION

This application claims benefit of priority under 35 U.S.C. § 119 to Japanese Patent Applications No. 2003-33943, filed on Feb. 12, 2003 and No. 2003-309146, filed on Sep. 1, 2003, the entire contents of which are incorporated by reference herein.

BACKGROUND OF THE INVENTION

1. Field of the Invention

The present invention relates to a fuel tank mount structure for allowing a fuel tank to be efficiently located below a floor of a rear area of a vehicle body.

2. Description of the Related Art

Heretofore, when installing a highly pressurized fuel tank such as a CNG bomb on a vehicle, a vehicle body structure is disclosed wherein a fuel tank mounting structure is located below a floor of a vehicle body through a tank mount structure (refer to Japanese Patent Application Laid-Open Nos. 200246484 and 2001-146115).

SUMMARY OF THE INVENTION

However, since various vehicle body components, such as a suspension, are located below a floor of the rear of the vehicle body, it is hard to provide a sufficient space to allow the fuel tank to be located.

Therefore, it is an object of the present invention to provide a fuel tank mount structure that has a high space efficiency.

In order to achieve the above object, the present invention contemplates to provide a fuel tank mount structure to allow a high pressure fuel tank to be mounted below a floor of the rear of a vehicle body, wherein a front edge portion of a rear suspension member disposed in a rear area of the high pressure fuel tank is formed along a rear profile of the high pressure fuel tank.

DETAILED DESCRIPTION OF THE PREFERRED EMBODIMENT

Hereinafter, embodiments of the present invention are described with reference to the accompanying drawings.

FIRST EMBODIMENT

Figure 1:
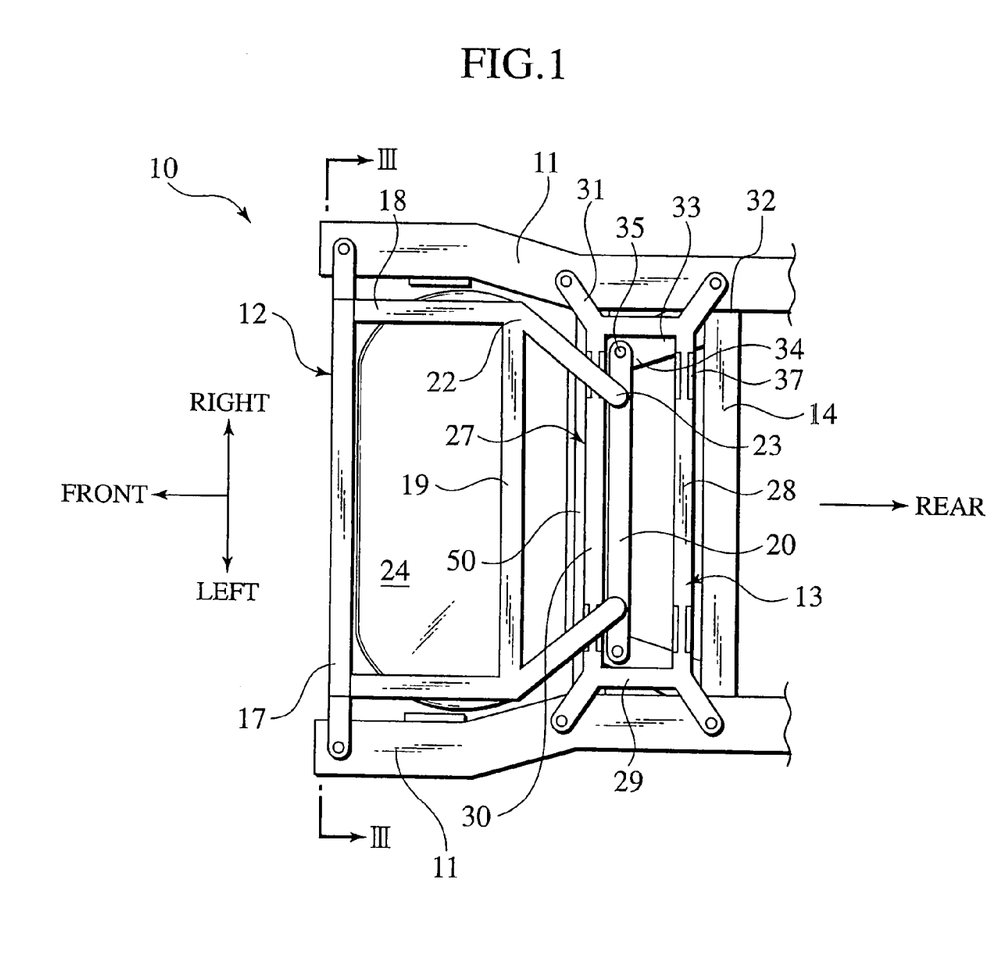
FIG. 1 is a bottom view of a lower area of a vehicle body having a fuel tank mount structure, as viewed from the bottom, of a first embodiment of the present invention.

A vehicle body rear section 10, to which a fuel tank mount structure of a first embodiment is applied, is configured in a structure as shown in FIG. 1. Rear side members 11, 11 extending fore and aft direction of a vehicle are disposed beneath a floor (not shown) of the vehicle, and a first tank frame 12 is disposed below the rear side members 11, 11. The first tank frame 12 supports a fuel tank 24, being filled with such as a hydrogen gas. A rear suspension member 13 is disposed in a rear area of the first tank frame 12. And a rear cross member 14 is disposed in a rear side of the suspension member 13. Hereinafter, these components will be described in detail.

Figure 3:
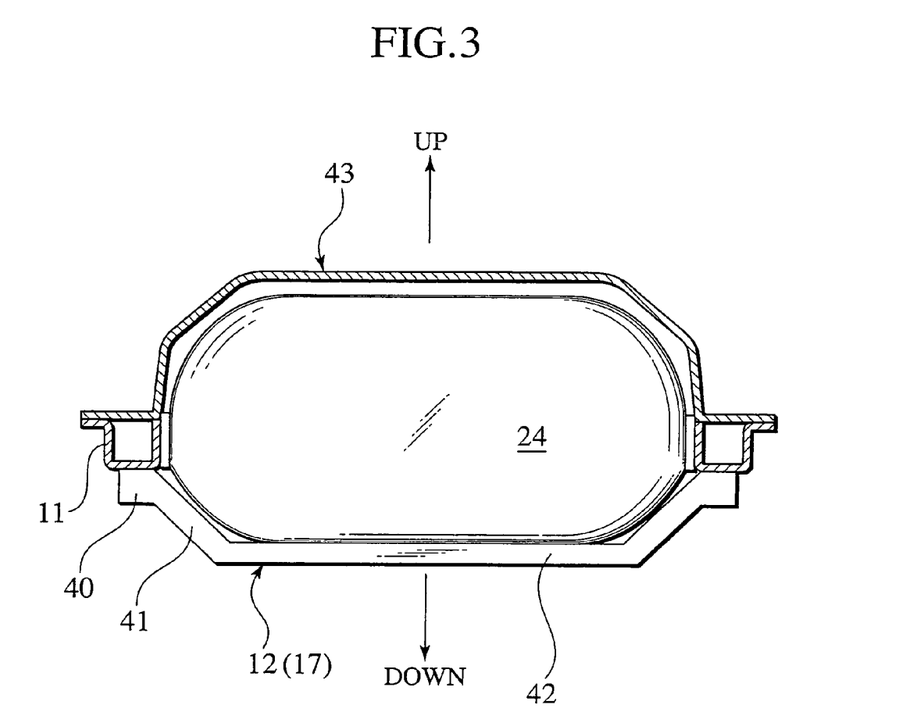
FIG. 3 is a cross sectional view taken on line III—III of FIG. 1, with the fuel tank mount structure being shown in upside down with respect to that of FIG. 1.

As shown in FIG. 3, the rear side members 11, 11 are disposed beneath a floor panel 43, and disposed on the both ends in the vehicle widthwise direction.

Figure 2:
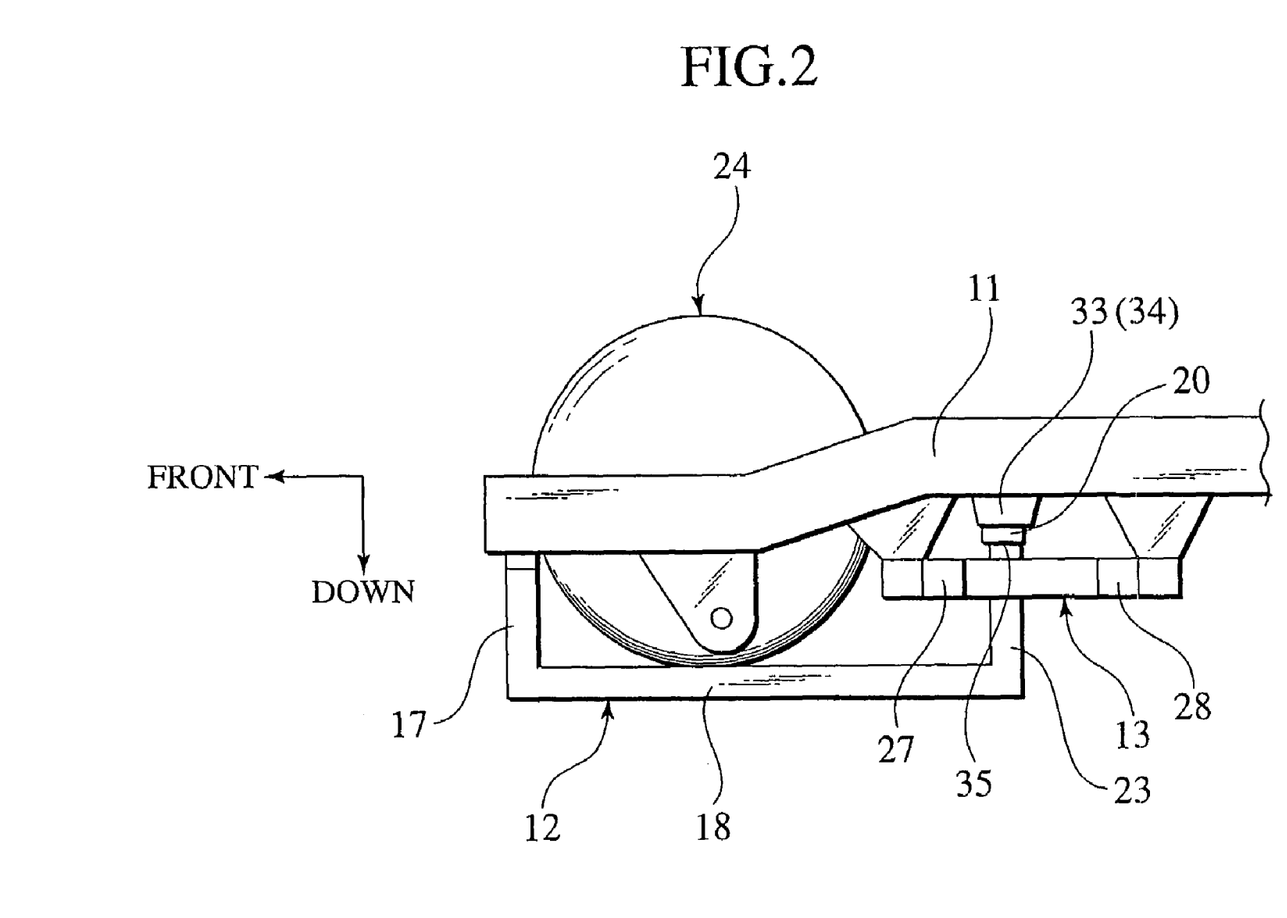
FIG. 2 is a side view showing the fuel tank mount structure in upside down with respect to that of FIG. 1.

Further, as shown in FIG. 2, located below front portions of the rear side members 11, the first tank frame 12 is disposed. As shown in FIG. 1, the first tank frame 12 is comprised of a front cross frame 17 laterally extending on a front side, side frames 18, 18 extending rearward of the vehicle at both left and right ends of the center cross member 17, a center cross member 19 fastened to central areas of the side frames 18, 18 in respect of the fore and aft direction of the vehicle, and a rear cross member 20 fastened to rear ends of the side frames 18, 18.

The front cross frame 17 extends in the vehicle widthwise direction to allow the left and right rear side members 11, 11 to be bridged. The side frames 18, 18 extend rearward of the vehicle from the front cross frame 17. The side frames 18 extend rearward of the vehicle and bend inward in the vehicle widthwise direction at joints 22, 22 of the center cross frame 19, and as shown in FIG. 2, rear end portions 23, 23 of the side frames 18, 18 are bent upward and coupled to the rear cross frame 20.

The rear suspension member 13 is disposed rearward of the vehicle and above the first tank frame 12 and is formed in a double cross shape as shown in FIG. 1. The rear suspension member 13 is comprised of a front suspension cross member 27 disposed on a forward area of the rear suspension member 13 and extending in the vehicle widthwise direction, a rear suspension cross member 28 disposed rearward of the front suspension cross member 27 on a rear side of the vehicle and extending in the vehicle widthwise direction, and suspension side members 29, 29 connecting the front suspension cross member 27 and the rear suspension cross member 28. Both the left and right ends of the front suspension cross member 27 and the rear suspension cross member 28 are fastened to lower surfaces of the rear side members 11, respectively.

Further, the front suspension cross member 27 is comprised of a body portion 30 formed in a central area in the vehicle widthwise direction, and a pair of extensions 31, 31 extending forward of the vehicle at left and right ends of the body portion 30, the body portion 30 and the extensions 31 being formed along a rear profile of the fuel tank 24.

The rear cross member 14 connects the rear side members 11, 11 to allow these components 11, 11 to be bridged in the vehicle widthwise direction at connecting portions 32, 32, and tank mount brackets 33, 33 extend from the connecting portions 32, 32 to front side of the vehicle. The tank mount brackets 33, 33 are mounted in the same height as the rear cross member 14. Fastening portions 35, 35 of both left and right ends of the rear cross member 20 of the tank frame 12 are mounted below distal ends 34, 34 of the tank mount brackets 33, 33. Also, front ends of the tank mount brackets 33, 33 are mounted to lower surfaces of the cross member 50 through which the rear side members 11, 11 are bridged.

As shown in FIG. 2, the fastening portions 35, 35 are disposed between the front suspension cross member 27 and the rear suspension cross member 28. Here, the rear suspension member 13 is placed between the side frames 18, 18 of the first tank frame 12 and the tank mount bracket 33.

Further, as shown in FIG. 1, rear suspension brackets 37 serving as a rear suspension fastening segment protrudes downwardly. The side frames 18, 18 are provided below the suspension brackets 37, 37 as shown in FIG. 1.

Further, as shown in FIG. 3, both the left and right sides of the front cross frame 17 are formed in approximately a trapezoid shape. That is, the front cross frame 17 of the first tank frame is comprised of both left and right end portions 40, 40 fastened to the lower surfaces of the rear side members 11, 11, respectively, inclined portions 41, 41 extending from both the left and right end portions 40, 40 and sloping downwardly of the vehicle toward a center in the vehicle widthwise direction, respectively, and a bottom portion 42 connected to terminal ends of the left and right inclined portions 41, 41, respectively. Also, as shown in FIG. 1, a floor panel 43 of the vehicle body is configured to form along an upper profile of the fuel tank 24.

The fuel tank mount structure 24 of the first embodiment having the structure set forth above has various advantages listed below.

First, as already described above with reference to FIG. 1, since the fuel tank 24 is located in a space defined by the rear suspension member 13 and the rear side members 11, 11, and the front suspension cross member 27 forming a front edge portion of the rear suspension member 13 is formed in a shape contoured along the rear profile of the fuel tank 24, and therefore a gap between the fuel tank 24 and the rear suspension member 13 can be minimized, resulting in a capability of improving a space efficiency in an area below the floor panel 43.

Further, since the tank mount brackets 33, 33 are mounted to the joint portions 32, 32 between the rear side members 11, 11 and the rear cross member 14, an improved rigidity of the vehicle body can be obtained. And therefore, it is possible for the connecting portions 32, 32 to be restricted from being deformed due to impact loads applied to the rear of the vehicle.

In addition, as described with reference to FIG. 3, due to the presence of the first tank frame 12 having the front cross frame 17 is configured to extend upward of the vehicle and outward in the vehicle widthwise direction in a gradual slope toward the rear side members 11, 11, such a structure contributes to an increase in a rigidity of the vehicle body, while enabling the vehicle body from being deformed due to impact loads, such as sidewise collisions, applied to a side of the vehicle.

And, as shown in FIG. 2, since the fastening portions 35, 35 being located at the rear side of the first tank frame 12 are disposed between the front suspension cross member 27 and the rear suspension cross member 28 of the rear suspension member 13, the first tank frame 12 for the fuel tank 24 can be fastened to the vehicle body while permitting the rear surface of the fuel tank 24 to be placed near the rear suspension member 13 as close as possible. Also, according to this structure, it is possible to alleviate an impact load applied to the vehicle from the longitudinal direction of the vehicle.

Furthermore, as shown in FIG. 2, since the side frames 18 connecting the fore and aft portions of the first tank frame 12 are located below the rear suspension brackets 37, 37 that serve as rear suspension fastening portions of the rear suspension member 13, the side frames 18, 18 do not obstruct the movement of the suspension 38, and therefore the fuel tank 24 and the suspension 38 can be placed in a high space efficiency.

Also, although a distance between the rear terminal portions of the side frames 18, 18, bent inward in the vehicle widthwise direction on the both sides of the side frames 18 is shortened because the side frames 18 of the first tank frame 12 are located below the rear suspension racket pairs 37, the presence of the rear terminal portions of the side frames 18 connected to the rear cross frame 20 while connecting the both ends of the rear cross frame 20 to the tank mount brackets 33 provides an improved degree of freedom in mounting to allow the first tank frame 12 to be fastened to a highly rigidity area of the vehicle body, enabling the rear end portions of the first tank frame 12 to have an increased mount span in the vehicle widthwise direction while improving a mount rigidity of the first tank frame 12.

SECOND EMBODIMENT

A second embodiment of this invention is described below, with the same component parts as those of the first embodiment bearing like reference numerals for omitting redundant description.

Figure 4:
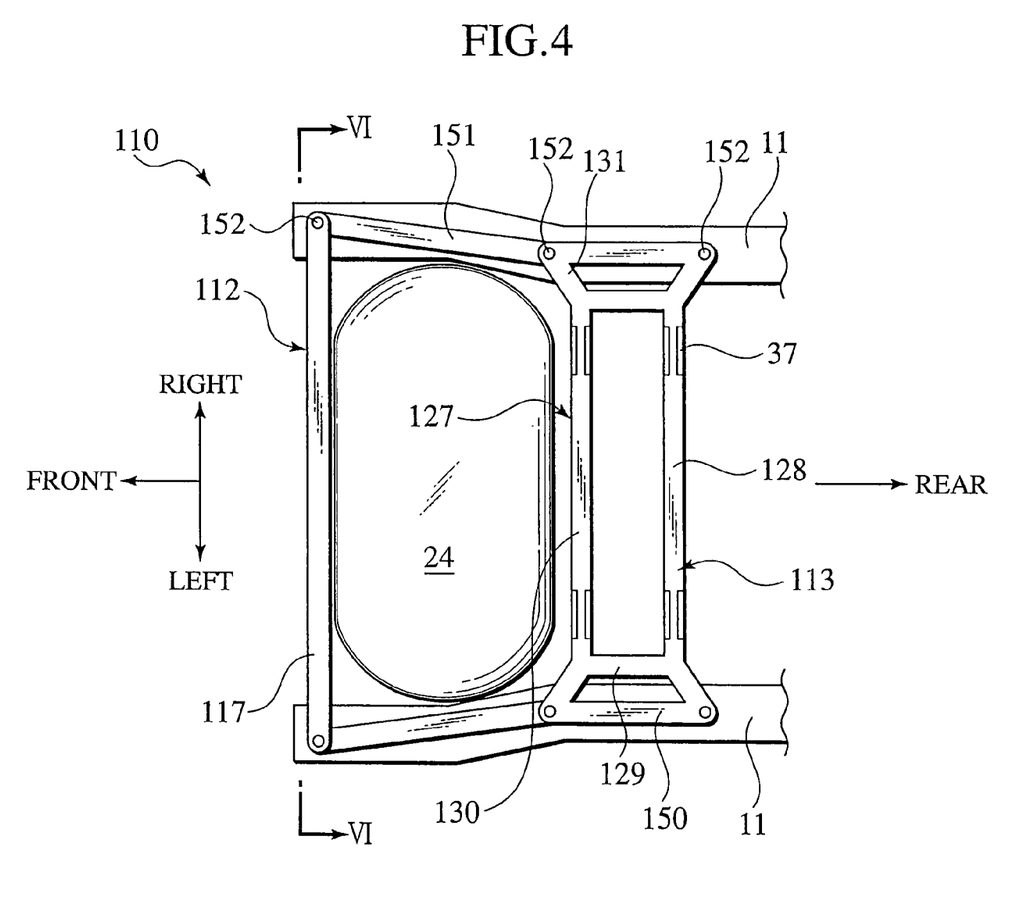
FIG. 4 is a bottom view of a lower area of a vehicle body having a fuel tank mount structure of a second embodiment of the present invention.

FIG. 4 is a bottom view of a vehicle body rear section 110, to which a fuel tank mount structure of a second embodiment is applied, as viewed from the bottom. Like in the first embodiment set forth above, the rear side members 11, 11 extending fore and aft direction of the vehicle are disposed on both sides of the vehicle body in the widthwise direction thereof. And, a rear suspension member 113 is placed in a rear area of the fuel tank 24, and a second tank frame 112 is placed so as to straddle over the fore and aft areas of the fuel tank 24.

The rear suspension member 113 is unitarily comprised of a front suspension cross member 127 positioned in the front of the rear suspension member 113 and extending in the vehicle widthwise direction, a rear suspension cross member 128 positioned rearward of the front suspension cross member 127 and extending in the vehicle widthwise direction, side suspension cross members 150, 150 connecting both left and right ends of the front suspension cross member 127 and the rear suspension cross member 128, and suspension side members 129, 129 disposed inside the side suspension cross members 150, 150, respectively, in the vehicle widthwise direction and extending in the fore and aft direction of the vehicle while connected to the front suspension cross member 127 and the rear suspension cross member 128, respectively.

The front suspension cross member 127 and the rear suspension cross member 128 are placed so as to allow the left and right rear side members 11, 11 to be bridged. Also, the front suspension cross member 127 is unitarily further comprised of a body portion 130 linearly formed in a central area in the vehicle widthwise direction, and extensions 131, 131 extending obliquely forward of the vehicle from both left and right ends of the body portion 130. The body portion 130 and the extensions 131, 131 being formed in configuration contoured along the rear profile of the fuel tank 24. Additionally, the side suspension cross members 150 are disposed in the fore and aft direction of the vehicle along the lower surfaces of the rear side members 11.

And, as shown in FIG. 4, the second tank frame 12 is formed in a substantially U-shape in a plan view and comprised of a front cross frame 117 located in a front side, and side frames 151, 151 extending from both left and right ends of the front cross frame 117 toward the both left and right ends of the front suspension cross member 127. Also, the both left and right ends of the rear suspension member 113, the front cross frame 117 and the side frames 151 are mounted to the rear side members 11 by means of fastening units 152. Moreover, rear ends of the side frames 151 are integrally connected to the front ends of the side suspension cross members 150 and the both left and right ends of the side suspension cross members 127 by means of fastening units 152. Thus, the second tank frame 112 is integrally formed with the rear suspension member 113 (into a module structure).

Figure 5:
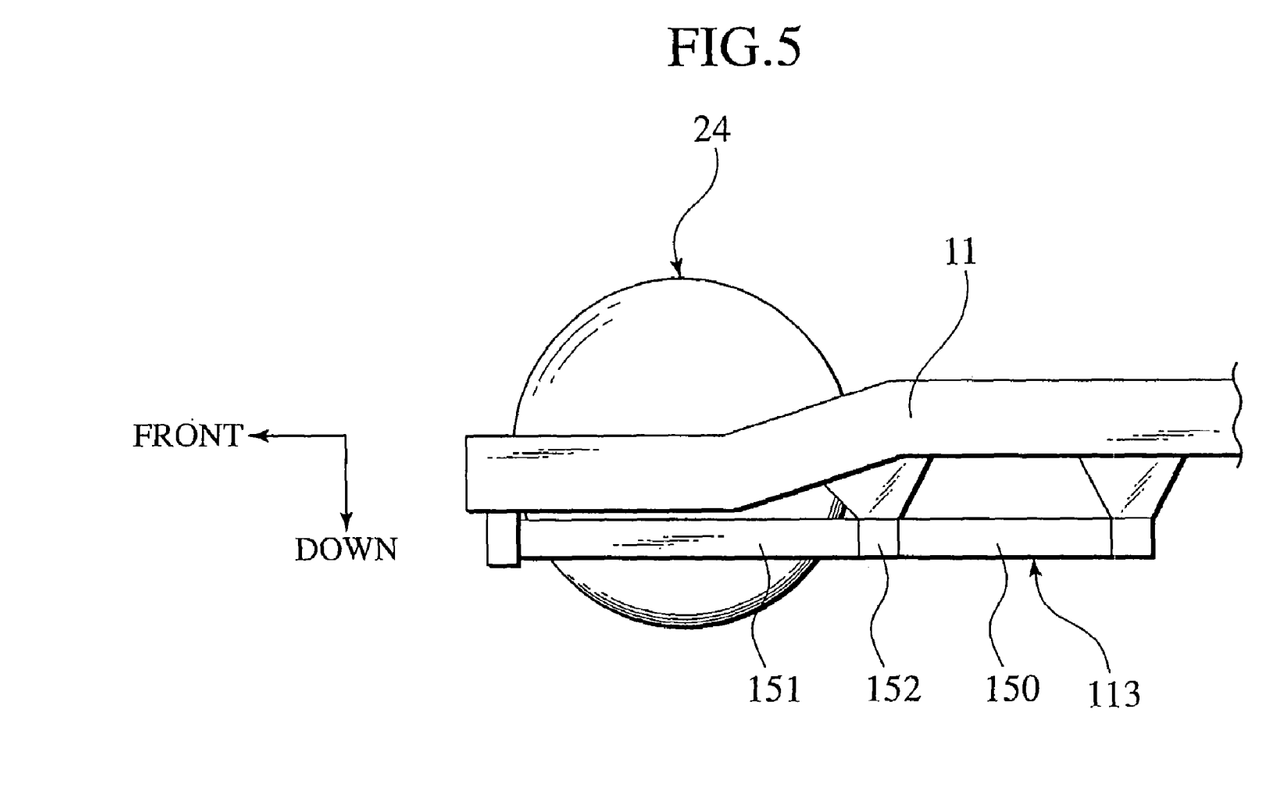
FIG. 5 is a side view showing the fuel tank mount structure of FIG. 4 in upside down with respect to that of FIG. 4.
Figure 6:
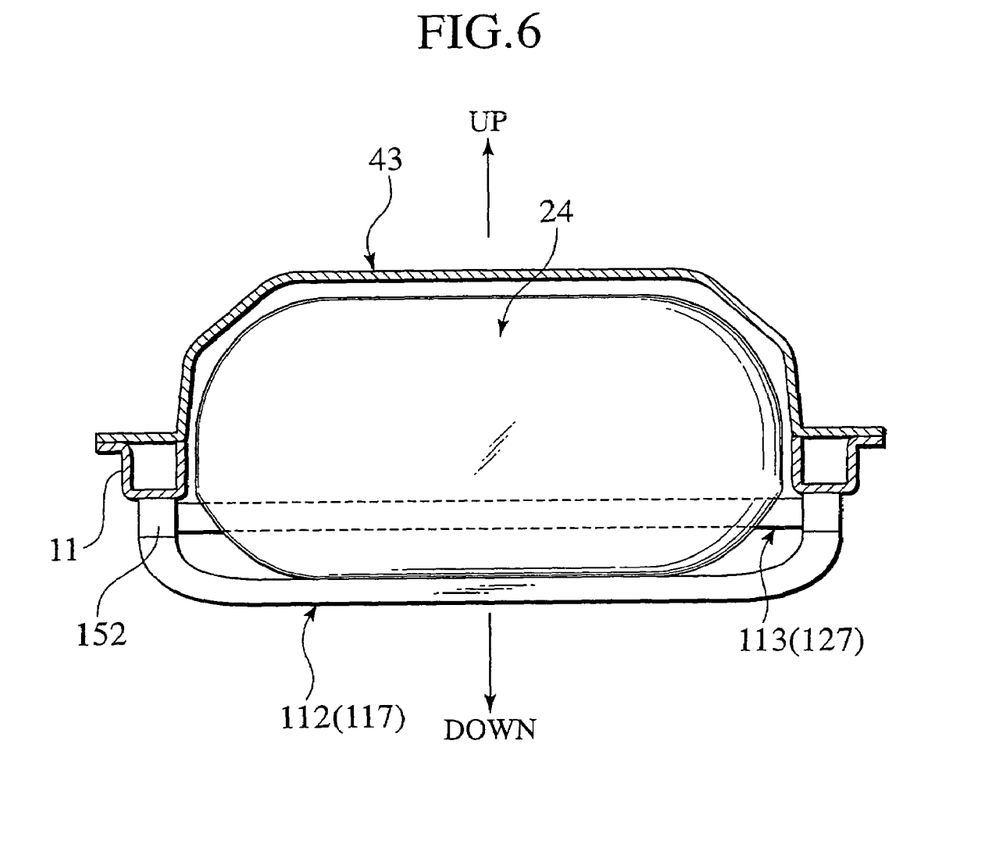
FIG. 6 is a cross sectional view taken on line VI—VI of FIG. 4, with the fuel tank mount structure being shown in upside down with respect to that of FIG. 4.

Additionally, as shown in FIG. 5, the side frames 151 forming the second tank frame 112 are linearly and integrally connected to the side suspension cross members 150 of the rear suspension member 113 by means of the fastening units 152 to form a module structure. Also, the side frames 151 are placed in substantially the same height as that of the side suspension cross members 150. Furthermore, as shown in FIG. 6, the both left and right ends of the front cross frame 117 forming the second tank frame 112 are mounted to lower ends of the fastening units 152 located beneath the rear side members 11. That is, the fastening units 152 are located beneath the rear side members 11, and the front cross frame 117 extends from the lower ends of the fastening units 152 obliquely downward and gradually curved inward in the vehicle widthwise direction. Also, on the rear side of the front cross frame 117, the rear suspension member 113 is linearly connected to the left and right rear side members 11, 11.

The fuel tank mount structure of the second embodiment set forth above has various advantages described below.

Since the second tank frame 112 is formed with the rear suspension member 113 in the unitary (module) structure, the rear suspension member 113 can be placed closer to the fuel tank 24 without wasteful space between the rear suspension member 113 and the fuel tank 24 while achieving reduction in the number of component parts, resulting in a capability of reducing cost and providing a light weight while improving a production efficiency.

Further, since the second tank frame 112 and the rear suspension member 113 are located by connecting the left and right rear side members 11, 11 with respect to one another, a strength of the vehicle body can be improved and, especially, the vehicle body is able to have a rigidity against loads, such as sidewise collisions, to be applied to the side of the vehicle body.

Additionally, since the side frames 151, 151 of the second tank frame 112 are disposed in the fore and aft direction of the vehicle body along the lower surfaces of the rear side members 11, 11 and both ends of the front cross frame 117 and the front suspension cross member 127 are connected to one another by means of the fastening units 152 in a bridged form, it becomes possible for the vehicle body to have an increased rigidity that resists against loads, such as rear collisions, applied to the rear of the vehicle.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A fuel tank mount structure to place a fuel tank of a vehicle beneath a rear area of a floor of the vehicle, the fuel tank mount structure comprising:
    a first tank frame holding the fuel tank which is mounted to a below area of rear side members placed on left and right sides of a vehicle body in a longitudinal direction of the vehicle body;
    a rear suspension member disposed rearward of the fuel tank and which comprises a front suspension cross member formed so as to extend in a vehicle widthwise direction from the one rear side member to the other rear side member, a rear suspension cross member disposed rearward of the front suspension cross member so as to extend in the vehicle widthwise direction from the one rear side member to the other rear side member, and suspension side members disposed along a vehicle longitudinal direction and connecting the rear suspension cross member and the front suspension cross member and formed in a double cross shape;
    wherein the front suspension cross member is contoured along a rear profile of the fuel tank; and
    wherein a rear side of the first tank frame is mounted to the vehicle body at an area between the front suspension cross member and the rear suspension cross member.

2. The fuel tank mount structure according to claim 1, wherein the first tank frame further comprises a front cross frame extending in the vehicle widthwise direction, a center cross frame extending in the vehicle widthwise direction, a rear cross frame and side frames connecting the front cross frame and the center cross frame;
    wherein right and left front portions of the front cross frame are inclined upward of the vehicle and outward in the vehicle widthwise direction so as to form inclined portions;
    wherein the inclined portions are fixed to the rear side members respectively; and
    wherein rear end portions of the side frames are bent upward and fixed to the rear cross frame.

3. The fuel tank mount structure according to claim 1, further comprising a rear cross member connecting the rear side members at connecting portions;
    wherein fastening portions of left and right ends of a rear cross frame of the first tank frame are mounted below distal ends of tank mount brackets; and
    the tank mount brackets extend from the connecting portions to a front side of the vehicle.

4. The fuel tank mount structure according to claim 2, wherein the side frames are disposed downward of rear suspension brackets of the rear suspension member.

5. The fuel tank mount structure according to claim 4, wherein the side frames are configured to bend inwardly in the vehicle widthwise direction as the side frames extend rearwardly, and rear ends of the side frames are fastened to the rear cross frame which is located in a rear end of the first tank frame, at positions inward of both ends thereof in the vehicle widthwise direction, with the both ends of the rear cross frame being fastened to the vehicle body.

6. The fuel tank mount structure according to claim 1, wherein a second tank frame for holding the fuel tank is unitarily formed with the rear suspension member.

7. The fuel tank mount structure according to claim 6, wherein the second tank frame is positioned forward of the fuel tank,
    and wherein the second tank frame and the rear suspension member are connected to the rear side members.

8. The fuel tank mount structure according to claim 6, wherein the second tank frame comprises a front cross frame and side frames extending forward of both left and right ends of the front cross member.

9. The fuel tank mount structure according to claim 1, wherein a rear portion of the first tank frame is mounted between the front and rear suspension cross members.

10. A fuel tank mount structure to place a fuel tank of a vehicle beneath a rear area of a floor of the vehicle, the fuel tank mount structure comprising:
   a first tank frame holding the fuel tank which is mounted to a below area of rear side means placed on left and right sides of a vehicle body in a longitudinal direction of the vehicle body;
   a rear suspension means disposed rearward of the fuel tank and which comprises a front suspension cross means formed so as to extend in a vehicle widthwise direction from the one rear side means to another rear side means, a rear suspension cross means disposed rearward of the front suspension cross means so as to extend in the vehicle widthwise direction from the one rear side means to the other rear side means, and suspension side means disposed along a vehicle longitudinal direction and connecting the rear suspension cross means and the front suspension cross means and formed in a double cross shape;
   wherein the front suspension cross means is formed in a configuration contoured alone a rear profile of the fuel tank; and
   wherein a rear side of the first tank frame is mounted to the vehicle body at an area between the front suspension cross means and the rear suspension cross means.

* * * * *